(12) United States Patent
Westhoff et al.

(10) Patent No.: US 7,677,829 B2
(45) Date of Patent: Mar. 16, 2010

(54) INSERTS AND REUSABLE HOLDER THEREFOR

(75) Inventors: James A. Westhoff, Langhorne, PA (US); James A. Kelly, Upper Black Eddy, PA (US); James Mirales, Jamison, PA (US)

(73) Assignee: Poly-Tec Products, Inc., Tullytown, PA (US)

( * ) Notice: Subject to any disclaimer, the term of this patent is extended or adjusted under 35 U.S.C. 154(b) by 1182 days.

(21) Appl. No.: 11/254,940

(22) Filed: Oct. 20, 2005

(65) Prior Publication Data

US 2007/0090566 A1    Apr. 26, 2007

(51) Int. Cl.
*F16B 21/02* (2006.01)
(52) U.S. Cl. .................... 403/2; 403/348; 403/349
(58) Field of Classification Search .......... 403/2–4, 403/348–353
See application file for complete search history.

(56) References Cited

U.S. PATENT DOCUMENTS

| 815,627 | A | * | 3/1906 | Oldham | ............ | 285/84 |
| 3,974,615 | A | | 8/1976 | Ditcher | | |
| 7,108,101 | B1 | * | 9/2006 | Westhoff et al. | ......... | 182/90 |

FOREIGN PATENT DOCUMENTS

CA    1 040 844    10/1978

OTHER PUBLICATIONS

A-Lok® Flex-Lok Plastic Manhold Step Insert; © 1985.
Oxford Industrial Technologies, LLC, Toggle-Lok®.
Oxford Industrial Technologies, LLC, Precast Concrete Insert/Lift Anchor.
M.A. Industries, Press Fit Lift Inserts.

* cited by examiner

Primary Examiner—Victor MacArthur
(74) Attorney, Agent, or Firm—Volpe and Koenig, P.C.

(57) ABSTRACT

Method and apparatus for providing inserts, such as lift inserts and step inserts, in cast members. The inserts have breakaway tabs mounted in receiving slots in either a reusable holder or disk-shaped member. The assembled insert and holder are inserted through a collar on the outer jacket of a mold assembly and a locking pin passes through cooperating openings in the holder and collar to retain the lift insert/holder in place during the casting operation. The disk-shaped member is fixed to a jacket of the mold assembly. The breakaway tabs break away from the insert when the cast member is separated from the mold assembly, the breakaway tabs being discarded and the holder (disk-shaped member) being reusable many times for subsequent casting operations. The slots, in one embodiment, have a locking shoulder to lock the tabs in their slots. In another embodiment, a cam surface on the tabs lock the tabs in the slots. In another embodiment, one slot and one tab differ in radial or circumferential length from the other tabs and slots to permit alignment between the slots and tabs in only one position to assure that the tabs are properly mounted in the holder.

7 Claims, 6 Drawing Sheets

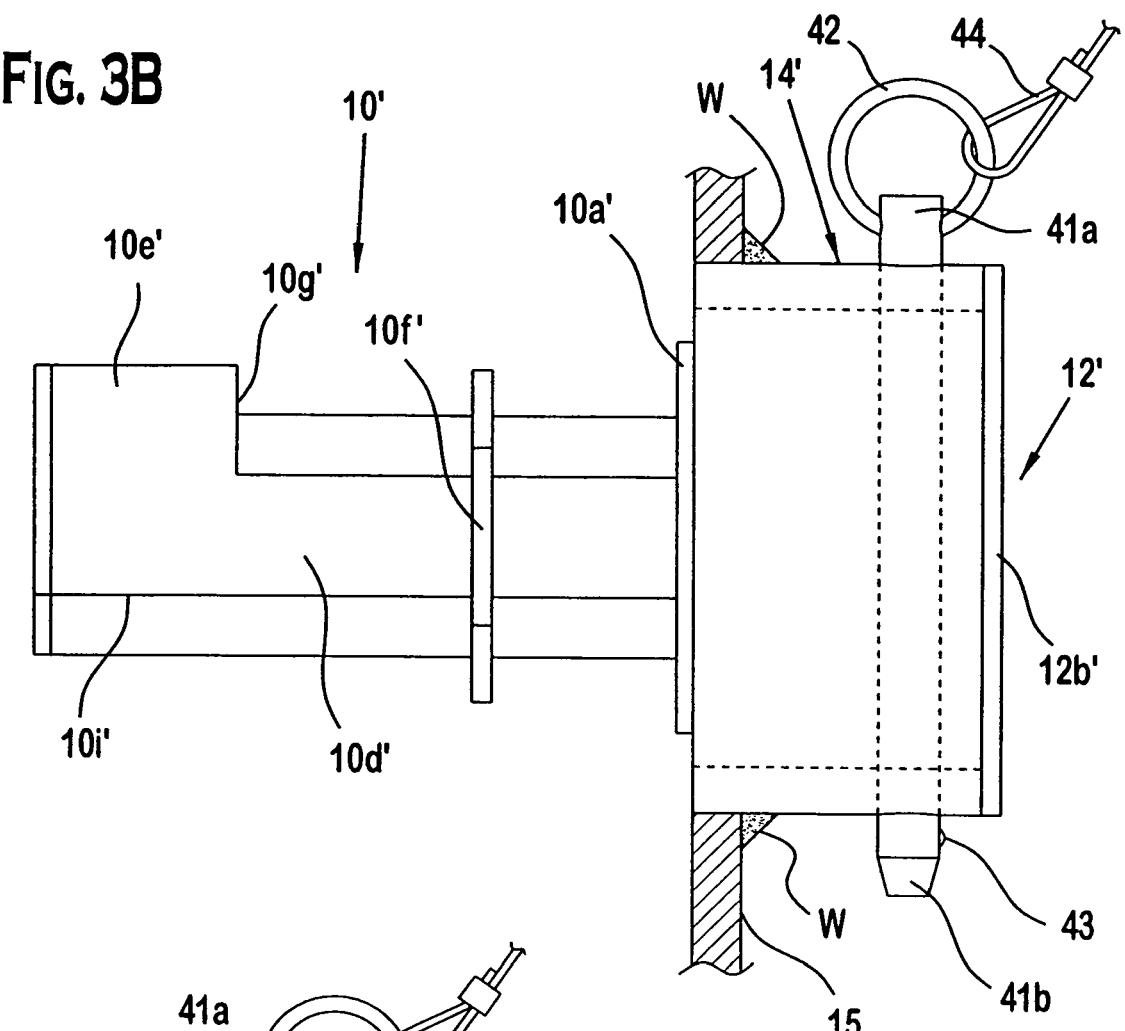
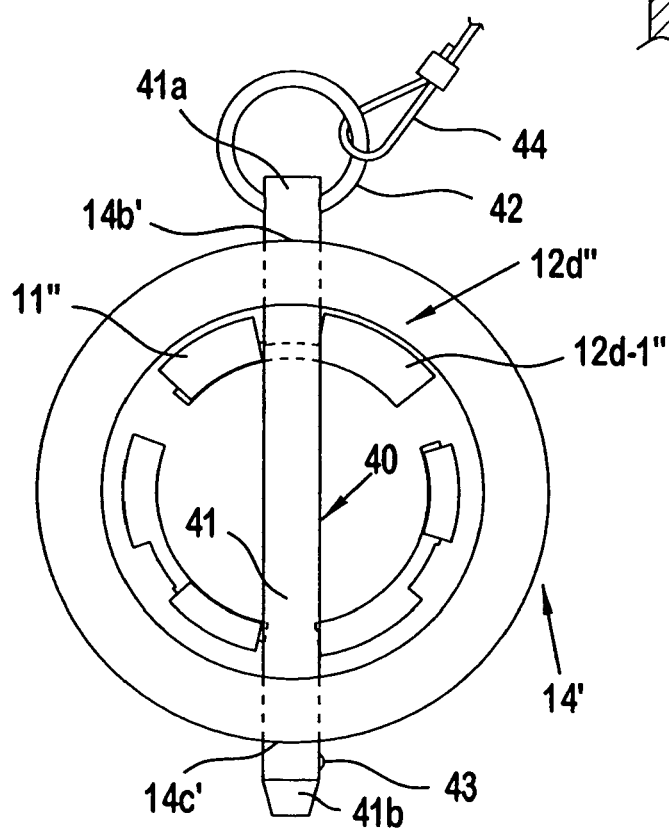

INSERTS AND REUSABLE HOLDER THEREFOR

FIELD OF INVENTION

The present invention relates to lift inserts employed in cast concrete members and the like and more particularly to a novel reusable holder for inserts and novel insert designs for coupling the lift insert to the reusable holder.

BACKGROUND

Inserts, such as lift inserts are typically employed in cast members such as manhole assemblies to facilitate lifting and handling of the cast members after casting is completed.

Conventional lift inserts are typically arranged to be mounted to an interior jacket or core mold member preparatory to the casting operation. The conventional lift insert is then held in position by a spring loaded holder. Once the lift insert portion is embedded in the cast member, the holder is subsequently removed.

Due to the inconvenience of mounting a conventional lift insert to the interior or core of a mold assembly, the present inventors have designed a lift insert capable of being mounted upon the outer jacket of a mold assembly, greatly facilitating both the mounting of a lift insert to the mold assembly outer jacket preparatory to a casting operation and subsequent removal of the holder portion of the lift insert from the outer jacket preparatory to a new casting operation.

In addition, the spring loaded holder used to position the conventional lift insert is replaced with a simplified reusable holder.

SUMMARY

The novel insert design and method of the present invention is characterized by comprising a holder portion designed, in one embodiment, to be inserted into a collar fixed to the outer jacket of the mold assembly and locked in position with a locking pin which assures positioning and alignment as well as retention of both the holder portion and the insert orientation during the casting operation. The holding portion is provided with a two or more curved slots, each provided to receive one of a like number of cooperating curved, breakaway tabs arranged along a disc-shaped portion of the insert and each adapted to be inserted into one of the cooperating curved slots on the holder. The tabs, in one embodiment, are provided with cam surfaces to lock the insert to the holder member. A pin, such as a spring-biased plug pin, is inserted into an opening along the circumference of the holder member to maintain the holder member, and hence the insert, in the proper orientation preparatory to the casting operation. In another embodiment, one of the tabs and the cooperating curved slot in the holder portion are of a larger size than the remaining tabs and slots to prevent the insert from being improperly oriented when mounted to the reusable holder.

After the casting material is inserted into the mold assembly and has been properly set, the cast member is separated from the mold assembly outer jacket, causing the tabs to break away, the insert being retained within the cast member and the holder being retained within the collar.

The holder, which is formed of a suitable rugged material such as steel or a rugged plastic material, is removed from the collar and may be reused many times, whereupon a new lift insert is mounted to the holder preparatory to a new casting operation. The breakaway tabs remaining in the holder are discarded.

The aforesaid insert is preferably a plastic member having a shape designed, in one preferred embodiment, to receive a lift pin to facilitate lifting of the cast member.

The holder of the present invention may be used with other diverse types of inserts. For example, a step insert or a lift insert may be provided with breakaway tabs. In addition, the holder which receives the tabs of either a step insert or a lift insert may be replaced with a disk-shaped plate, placed in an opening in a jacket of the mold assembly.

BRIEF DESCRIPTION OF THE DRAWING(S)

The present invention will be understood from a consideration of the detailed description and drawings wherein like elements are designated by like numerals and, wherein:

FIG. 3B is a perspective view of the lift insert, holder and collar of FIG. 3 shown fully assembled.

FIG. 3C is a detailed end view of the collar and cooperating locking pin of FIG. 3.

DETAILED DESCRIPTION OF THE PREFERRED EMBODIMENT(S)

Figure 1:
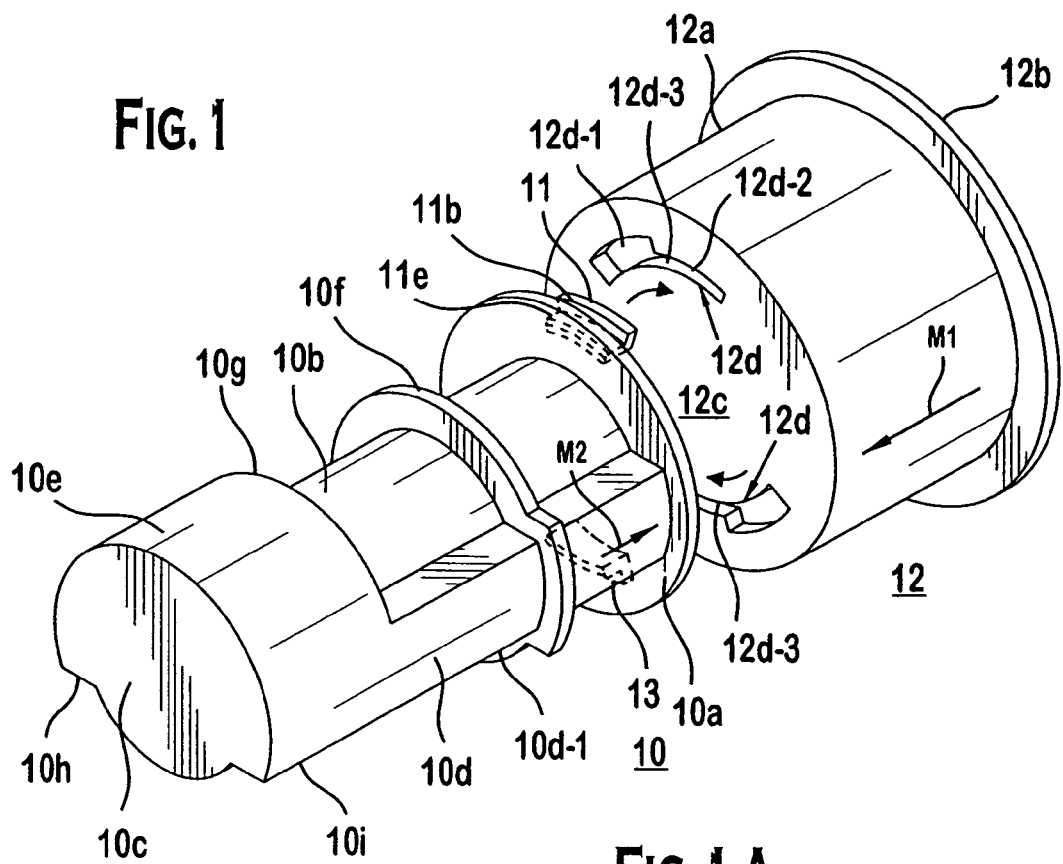
FIG. 1 is an exploded perspective view of the holder and insert of the present invention.
Figure 1A:
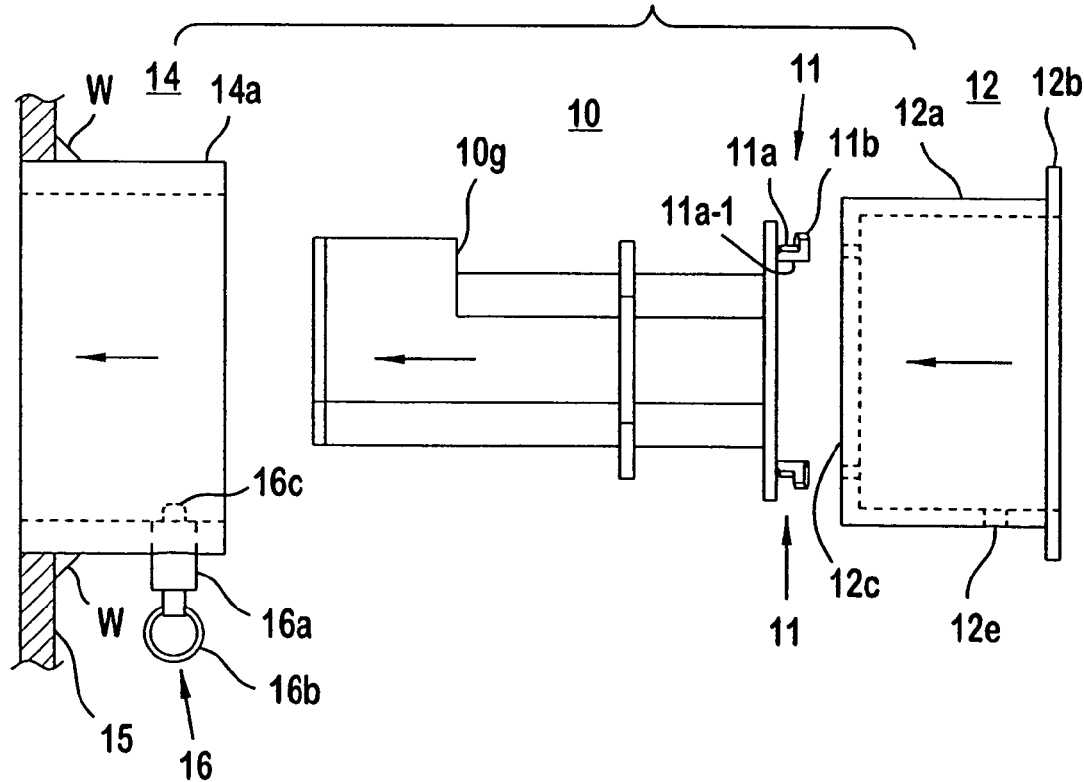
FIG. 1A is an exploded side view showing the lift insert and holder of FIG. 1 and further showing the collar which is mounted to the exterior of an outside jacket of the mold assembly for receiving and supporting the lift insert holder and hence the lift insert in their proper orientation.
Figure 1B:
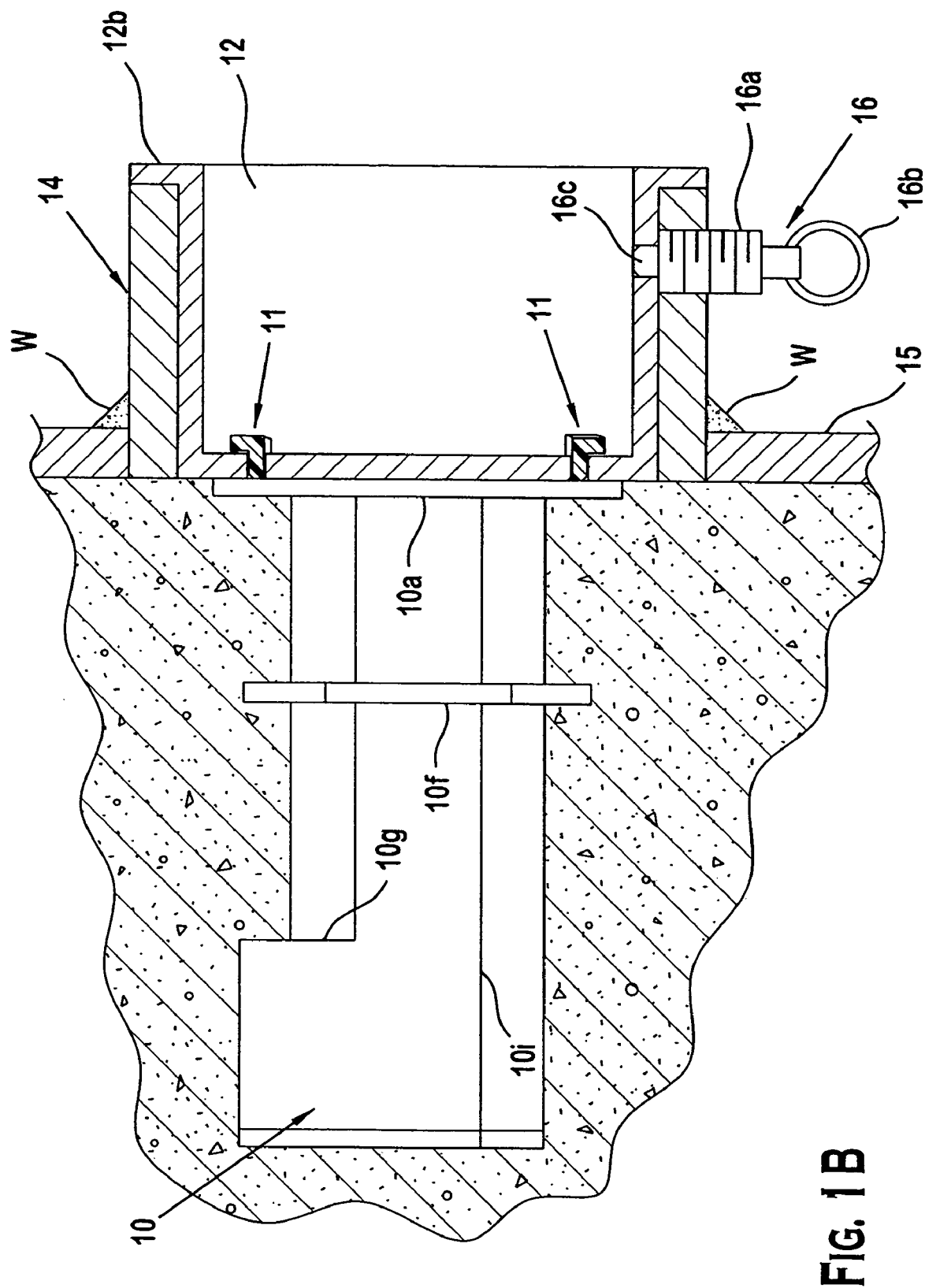
FIG. 1B shows the lift insert holder and collar in the fully assembled position and after cast material is inserted into the mold assembly.
Figure 1C:
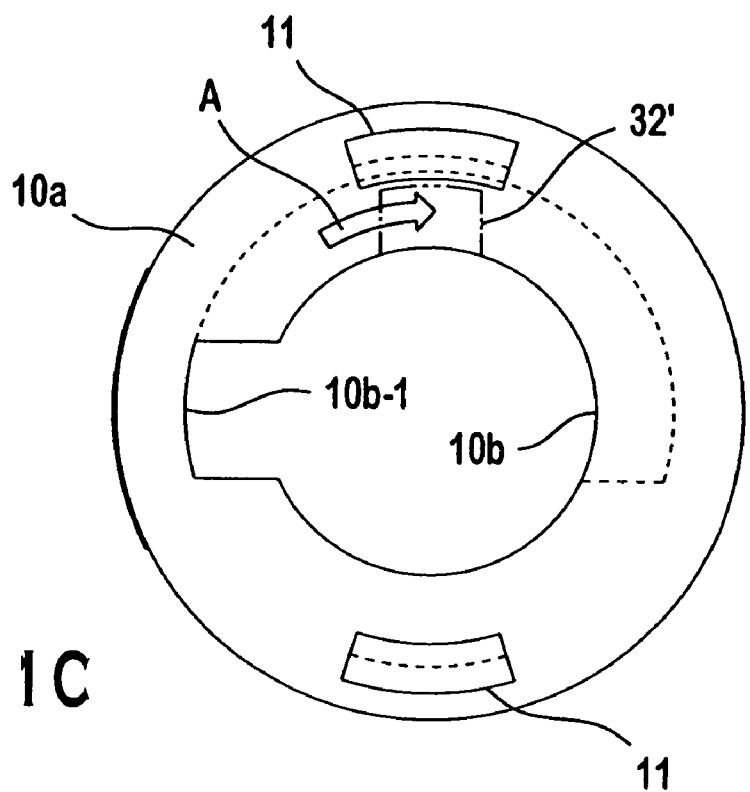
FIG. 1C is a detailed end view of the open end of the lift insert of FIG. 1.
Figure 2:
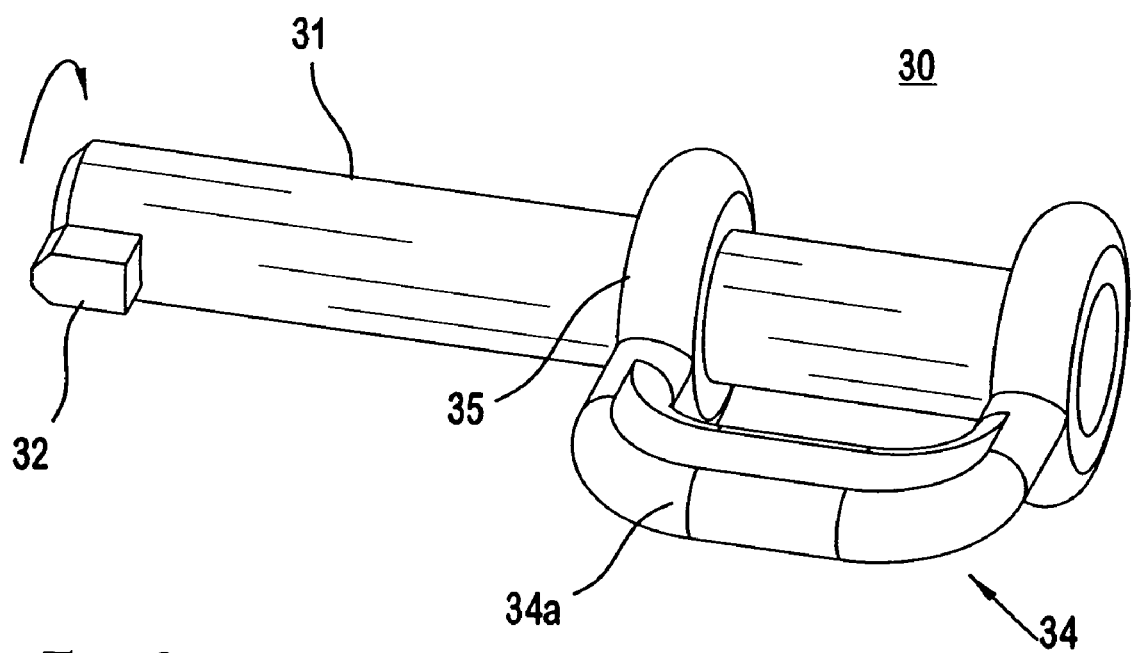
FIG. 2 is a view of a lift pin for use in the lift insert of FIGS. 1-1C.

Making reference to FIGS. 1 through 1C, there is shown therein a lift insert 10 having a lift key receiving end comprising a circular-shaped flange 10a and a key-shaped opening 10b for receiving a lift pin 30, shown in FIG. 2 and which is comprised of a substantially cylindrical shaped body 31 having an integral projection or key 32 at one end thereof extending radially outward therefrom and a substantially U-shaped lifting portion 34 near the opposite end thereof and welded to body 31 as shown at 35.

Returning to FIGS. 1 through 1C, as well as FIG. 2, the cylindrical-shaped body portion 31 enters through the substantially circular-shaped opening 10b while the key portion 32 enters through the substantially rectangular-shaped portion 10b-1 of the key-shaped opening 10b. The lift pin 30, after insertion into the open end, is linearly moved toward the rearward or closed end 10c, the cylindrical-shaped body portion 31 moving through the cylindrical-shaped opening 10b and the key portion 32 moving along the substantially rectangular-shaped guide portion 10d. Once the lift pin passes into the partially cylindrical-shaped portion 10e, the lift pin is free to be rotated in a clockwise direction shown by arrow A in FIG. 1C to bring the U-shaped portion 34 to a vertical (i.e.

"12 o'clock") orientation with the lifting or yoke portion 34a substantially occupying a twelve o'clock position together with the projecting portion 32 shown in dotted fashion as 32' in FIG. 1C. The portion 10e has a radially aligned end wall 10i, which is aligned with and is a continuation of wall 10d-1 of the guideway 10d, and has a radially extending end wall 10h, which end walls limit the projection 32 to angular movement in the clockwise direction. Typically, a chain is passed through the lifting portion 34a to lift and transport the cast member after it has been set and ready for removal to another location. The lift pin rotates clockwise to the 12 o'clock position as a lifting force is applied to the lift pin by means of a chain coupled to a lift bar.

As is conventional, it is typical for at least two or more lift pins and lift inserts to be utilized to lift a cast member, the description set forth herein and directed to only a single lift pin being merely for purposes for simplicity. It should further be understood that the additional lift inserts and lift pins are substantially identical in design and function to the lift pin and lift insert described above, the lift inserts preferably being arranged in an equi-spaced manner about the cast member.

As is further conventional, the integral flange 10f and planar wall portion 10g serve to retain and anchor the lift insert in the cast material.

The disc-shaped front end 10a is provided with at least a pair of integral, arcuate-shaped breakaway tabs 11,11 substantially diametrically opposed to one another, each having a substantially L-shaped cross-section comprised of a joining portion 11a integrally joined to the disc shaped portion 10a and a flange portion 11b integrally joined to an outer end of portion 11a and having a cam surface 11c facing the outer surface 10a of the lift insert. Three (3) or more equi-spaced tabs may also be used, if desired.

The lift insert 10 is mounted to a lift holder 12 preparatory to insertion into a mold assembly. Holder 12 is preferably formed of a rugged material such as steel or a rugged plastic and has a hollow cylindrical body portion 12a provided with a continuous outwardly directed flange 12b at the open end thereof and is provided with a substantially closed end 12c having a pair of curved slots 12d at substantially diametrically opposed positions arranged within the perimeter of the closed end 12c. The curved slots 12d each have a wider portion 12d-1 narrowing to a portion 12d-2 of reduced width The slots 12d cooperate with tabs 11 as described below.

The breakaway tabs 11 have a circumferential length just slightly less than the circumferential length of the curved slot portion 12d-1. Each tab 11 is inserted into an associated one of the wider portions 12d-1. The curved, interior periphery 11a-1 of each of the tabs engages a marginal portion of the closed end 12c adjacent to the curved edges 12d-3, causing the flange portions 11b to move behind the outer circumferential edge of the narrow slot portions 12d-2 so that the cam surfaces 11c engage the interior surface of the closed end 12c of holder 12, causing the portions 12d-2 to be wedged between the outer surface of circular disc 10a and the cam surfaces of the flanges 11b thereby locking lift insert 10 to holder 12.

The assembled lift insert 10 and holder 12 are then moved into collar 14 fixedly mounted upon the outer jacket 15 of a conventional mold assembly. Collar 14 is welded to jacket 15 as shown by weldment W. The assembled lift insert 10 and holder 12 are moved into hollow cylindrical collar 14 until flange 12b engages the outer edge of collar 14, flange 12b limiting the depth that the joined elements 10 and 12 extend into the outer jacket and thereby positioning these elements at their proper depth (see FIG. 1B). The keyway opening is aligned so that the key position is aligned at the 9 o'clock position when the cast member is in its final position at a jobsite (keeping in mind that manhole bases are cast "upside down").

A locking pin assembly 16 having a threaded body portion 16a, threadedly engages a tapped opening in collar 14 and is provided with a spring loaded pin 16c. Pin 16c is normally biased to extend radially inwardly to the dotted line position shown in FIG. 1A. An opening 12e is provided at six o'clock position in the hollow cylindrical portion 12a of lift insert holder 12. Plug pin 16 has a pull ring 16b which is pulled downwardly to withdraw pin 16c into the plug pin assembly, enabling the free passage of the lift insert 10 and holder 12 through the collar 14. Holder 12 is oriented so that its opening 12e in sidewall 12a is aligned with the angular position of plug pin 16. When the flange 12b rests against the outer edge of collar 14, the ring 16b is released, causing pin 16c to be urged into the opening 12e thereby retaining the holder 12 and lift insert 10 in the proper orientation during the casting operation. It should be understood that at least two and, if desired, more than two collars 14 are provided at equi-spaced locations around the periphery of the mold assembly outer jacket each receiving an assembled holder/lift insert 10/12 and each having a locking pin assembly.

Cast material, typically concrete, is placed in the mold and after the cast material has set, the outer jacket and the cast member are separated, causing the tabs 11,11 to break away from the disc-shaped portion 10a of the lift insert. The lift inserts remain imbedded within the cast member and are ready for receipt of suitable lift pins for lifting and transporting the cast member.

The plug pins 16c assure proper orientation of the lift insert in the mold assembly and prevent the assemblies 10/12 from rotating during the casting operation thereby assuring the insertion of a lift pin into a lift insert at the 9 o'clock position and rotation of a lift pin to the 12 o'clock position so that its U-shaped lifting portion occupies the twelve o'clock position preparatory to lifting of the cast member.

Once the outer jacket and cast member are separated, the holder 12 may be removed from the collar 14 preparatory for use in a subsequent casting operation. The tabs 11 which have broken away from the lift insert are discarded. The holder may be utilized over and over again for subsequent casting operations.

The lift insert 10 shown in FIGS. 1 through 1C is preferably formed by molding and is produced as two separate components, namely the main body portion 10b and end cap 10c. These components are then assembled and welded or fused together.

Figure 3:
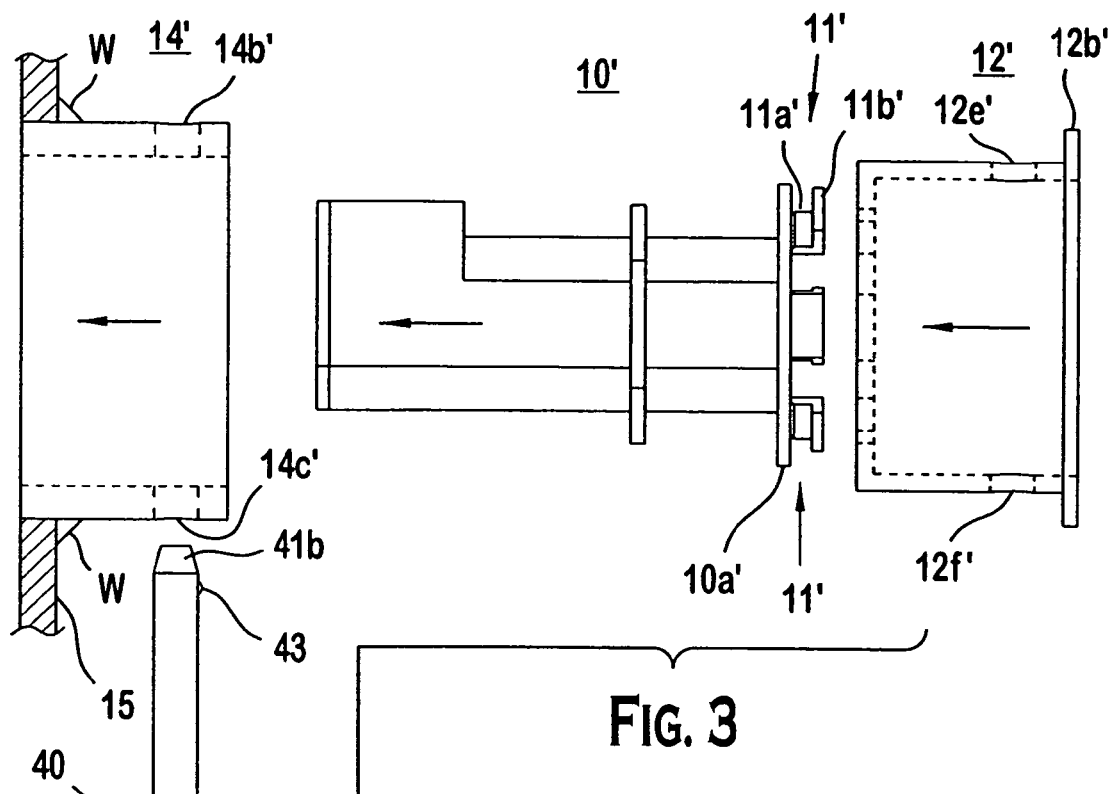
FIG. 3 is a perspective exploded view of another embodiment of the present invention.

The embodiment of FIGS. 3 through 3C comprises a lift insert 10' which differs from lift insert 10 shown, for example, in FIG. 1 in that three (3) breakaway tabs 11' are arranged, preferably at equi-spaced intervals about flange 10a'. However, it should be noted that a greater or lesser number of breakaway tabs may be employed. Each of the breakaway tabs 11', similar to the breakaway tabs 11 shown in FIG. 1A, is comprised of portions 11a', 11b'. The portions 11b' differ from the portions 11b in the embodiment of FIG. 1A in that no cam surfaces are provided.

Holder 12' differs from holder 12 of FIG. 1 in that a pair of openings 12e', 12e' are provided in the sidewall of holder 12' and aligned along a common diameter.

Holder 12' further differs from holder 12 of FIG. 1A in that three (3) equi-spaced, curved, slot portions 12d' are provided in the closed end 12c' of the holder, each curved slot being comprised of three (3) curved slot portions 12d-1', 12d-2' and 12d-3' each having a radial length, measured in the radial direction, of $D_1$, $D_2$ and $D_3$ respectively. Length D1 is greater than length D3 which is greater than length D2. The curvilinear length $C_1$ of slot portion 12d-1' is at least slightly greater than the curvilinear length of each of the breakaway tabs 11'. The slot portion 12d-2' has a cam surface arranged on the exterior edge 12e' of slot portion 12d-2' such that the cam edge 12e' gradually moves closer to the center point of closed end 12c' moving in the clockwise direction.

The manner in which each slot 12d' cooperates with its associated breakaway tab 11' is such that the lift insert 10' is brought into alignment with holder 12' so that each breakaway tab is inserted in an associated slot portion 12d-1'. The lift insert 10' is then rotated clockwise relative to holder 12' in a direction shown by arrow A in FIG. 3A, causing the flange portion 11b' of each breakaway tab 11' to move beneath the outer edge of curved slot portion 12d-2'. The portion 11a' of the tabs engage their associated exterior cam surface edge 12e', urging the tabs inwardly. As the lift insert continues to be rotated in the clockwise direction, each tab, including portions 11a, 11b', enters into the region of slot 12d-3', causing each tab to snap outwardly as it is free of the cam edge 12e'. The left-hand end of portion 11a' of each tab abuts against a shoulder 12s' between the right-hand end of section 12d-2' and the left-hand end of section 12d-3', preventing the tabs from being rotated counter-clockwise and thus prevented from being removed from curved section 12d-3'.

The assembled holder 12' and lift insert 10' (now locked in place) are then inserted into the hollow collar 14' on the outer jacket of the mold assembly. The openings 12e', 12f' of holder 12' are aligned with the openings 14b', 14c' provided in collar 14'. The flange 12b' of holder 12' engages the outer end of collar 14' and limits the depth to which the holder 12' is inserted into the collar thereby accurately positioning the lift insert 10' in the molding assembly.

An elongated locking pin assembly 40 is comprised of an elongated rod 41 having a pull ring 42 inserted into an opening 41a near one end of rod 41 and having a spring-biased ball member 43 arranged in an opening near opposite end of the rod 41, which ball serves as a click-stop member. An elongated cable 44 may be threaded through pull-ring 42, if desired and coupled at its opposite end to an anchor ring (not shown) provided on either the outer jacket 15 or collar 14' to assure it will not be misplaced.

The manner in which the locking assembly functions is such that when the lift insert/holder assembly 10'/12' is inserted into collar 14' and the openings 12e' and 12f' are aligned with openings 14b' and 14c', the end 41a of rod 41 is inserted into opening 14b'. In view of the fact that the outer diameter of rod 41 is preferably just slightly less than the inner diameter of openings 14b' and 14c', by applying a sufficient force to rod 14, the click-stop ball is pressed radially inwardly as it engages opening 14c', enabling end 41a of rod 41 to pass through opening 14c'. Thereafter, when rod 41a is passed through opening 14b', the click stop ball 43 is again pressed inwardly to enable rod 41 to pass through opening 14b'. When click-stop ball 43 is clear of the outer periphery of collar 14', click stop ball 43 is urged outwardly and is retained in this position by a bias means, such as a leaf spring or helical wound spring (not shown for purposes of simplicity) to thereby retain the locking assembly 40 in place during the casting operation.

The locking assembly 40 cooperates with the aligned openings in collar 14' and holder 12' to prevent both holder 12' and lift insert 10' from experiencing any linear movement along a longitudinal axis of lift insert 10' and holder 12' and further to prevent any rotational movement about the aforesaid longitudinal axis. The holder 12' and lift insert 10' are oriented so that the keyway is in the 9 o'clock position as was described above.

With the assembled holder 12' and lift insert 10' being inserted and held in the desired position and orientation, cast material is placed into the mold assembly. The locking pin 40 prevents the assembly 10/12 from experiencing any linear or rotational movement during the casting operation. When the cast material has been set, the cast member is separated from the mold assembly causing the breakaway tabs 31 to break away whereupon the lift insert 10' minus the breakaway tabs remains embedded in the cast member and the breakaway tabs and holder are retained in collar 14'.

Rod 41 is pulled out of the cooperating openings in the collar 14' and holder 12', holder 12' is removed from the collar, the breakaway tabs are discarded and the holder 12' is now ready for use in a subsequent casting operation. The holder 12', which is made of a suitable material such as steel or any suitable plastic, may be reused many times, thus reducing the cost of lift inserts.

The specific angular orientation of rod 41 when in the locking position shown in FIG. 3C is not critical so long as it forms an oblique angle with the vertical direction and so long as the end of the rod 41 having an opening 41a is not too close to the "twelve o'clock" position as such an orientation may serve to invite the ingress of unwanted cast material. The locking pin may be stored in collar 14' when not in use to assure that it will not be misplaced or lost.

The lift insert 10' may be employed with the holder 12 or 12' and may be employed with the collar 14 or 14' with equal success as compared with lift insert 10 or 10' by modification of insert 10' to provide the breakaway tabs similar to tabs 11' and to provide a pair of alignment openings such as 12e', 12f' shown in FIG. 3.

Making reference to FIG. 3C, one of the tabs, such as tab 11", is preferably provided with a flange portion 11b" greater in radial length than the flanges of the remaining tab(s) and one of the slots 12d" has its curved portion 12d-1" of a greater length in the radial direction than the remaining slots, to assure that the lift insert 10' can be mounted in only one orientation relative to the holder 12' to assure proper mounting.

As a further alternative, an alignment mark M1 may be placed on the holder 12 and a cooperating alignment mark M2 placed on the lift insert 10 to assure proper alignment, as shown in FIG. 1.

Figure 3A:
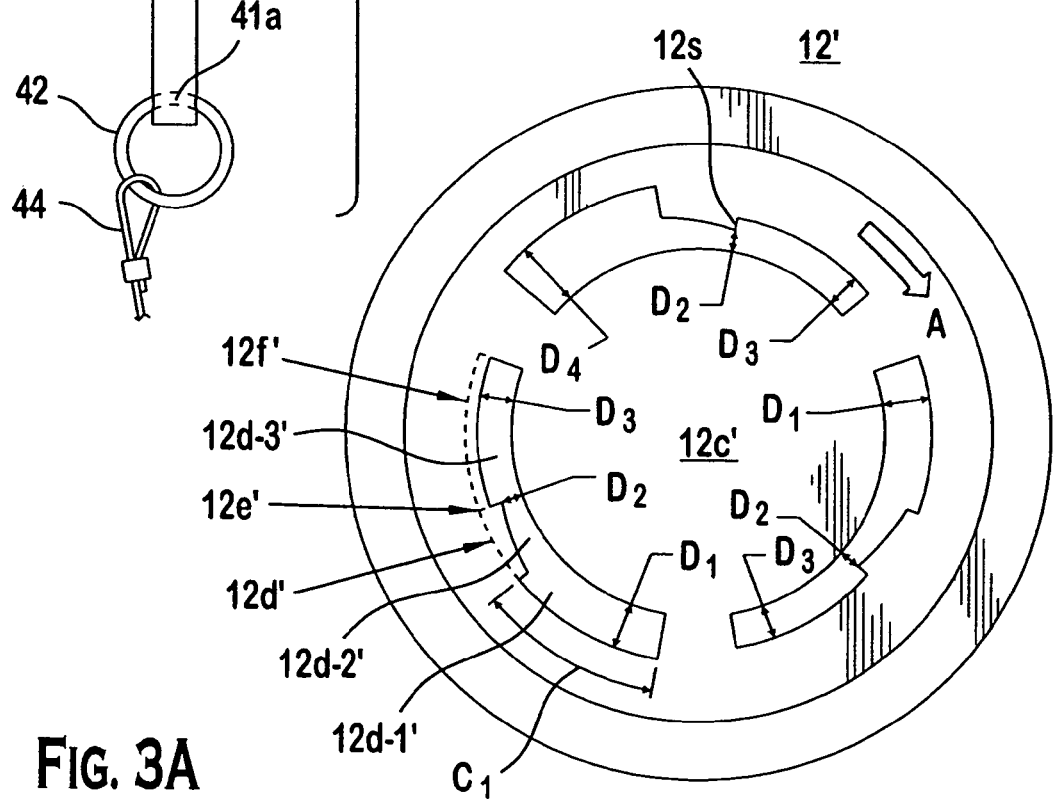
FIG. 3A is a view of the exterior surface of the holder of FIG. 3 showing the closed end having slots and cam surfaces provided therein.
Figure 4:
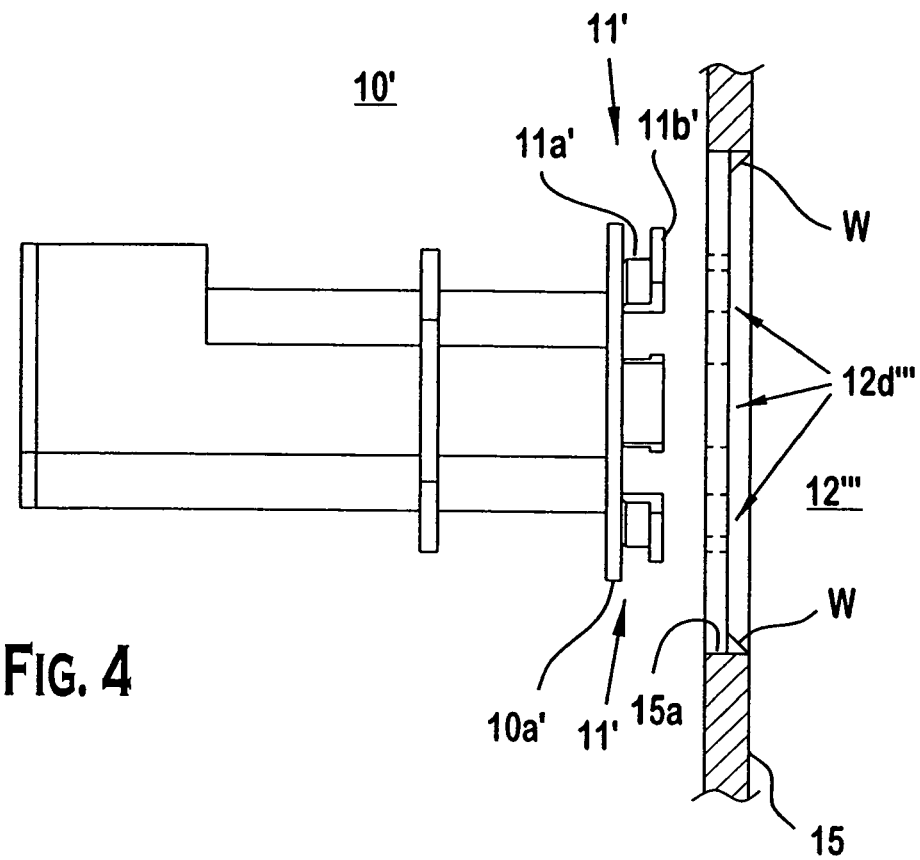
FIGS. 4 and 5 are exploded elevational views of still further embodiments of the present invention for receiving and supporting an insert.

FIG. 4 shows another embodiment of a holder for the lift insert 10', for example, and is comprised of a disk-shaped member 12 having slot portions 12d''' substantially identical in design and function to the slot portions shown in FIG. 3A. An opening 15a is machined or otherwise formed in the mold assembly outer jacket 15. The disk-shaped member 12'''' is placed in the opening 15a and is oriented at the proper angle to properly align the lift insert when embedded in the resulting cast member. The lift insert 10' is mounted to the disk-shaped member by reaching into the interior of the outer jacket 15, aligning the tabs 11' of the lift insert 10' with the slot portions in the disk-shaped member and then rotating the lift insert relative to the disk-shaped member to lock the lift insert to the disk-shaped member in a manner substantially identical to that employed in the embodiment of FIG. 3. The casting operation is substantially identical to the casting operation using the holder 12'. However, the disk-shaped member eliminates the need for a cup-shaped member 12' as well as collar 14 and locking pin 41.

The disk-shaped member may be employed with equal success on the interior jacket of the mold assembly for applications where it is desired to lift a cast member using lift inserts extending radially inwardly from an interior wall of a cast member.

In addition to the embodiments described above, the present invention may be employed to hold other types of inserts in place along an inner or outer jacket of a mold assembly.

Figure 5:
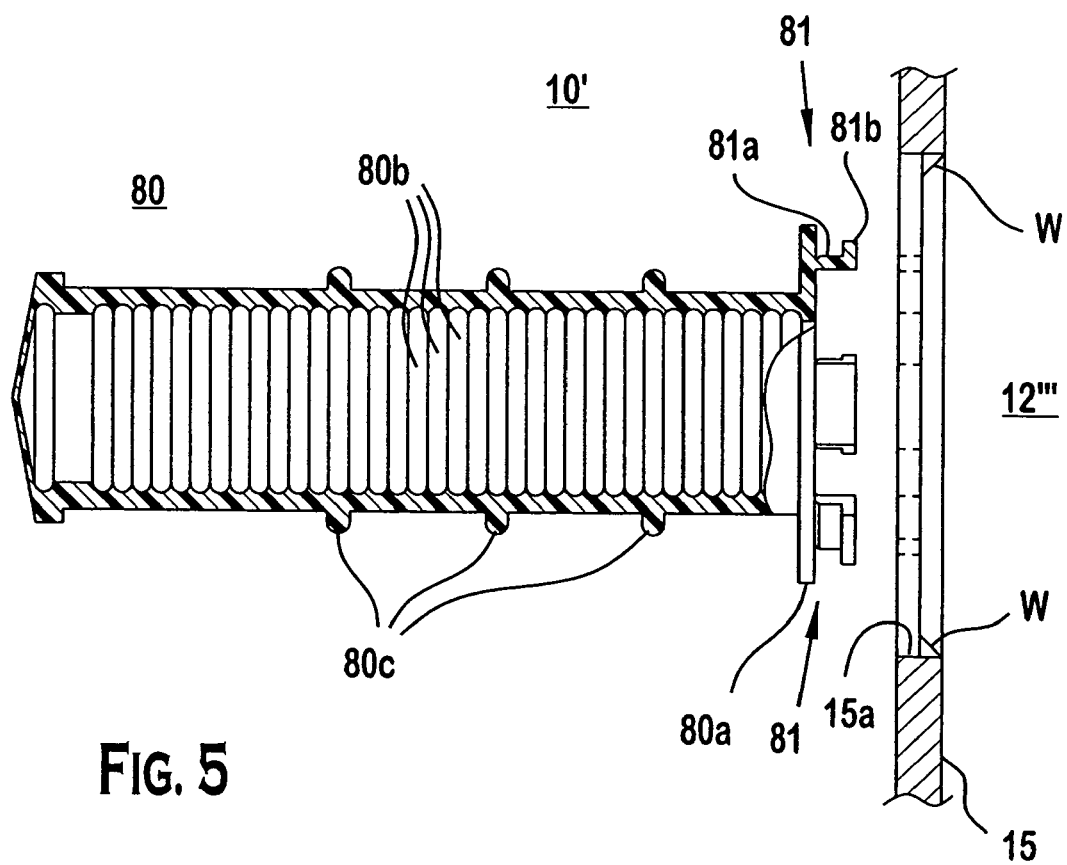

FIG. 5 shows a step insert 80 provided with an annular flange 80a having tabs 81 similar to those shown, for example, in FIG. 4 and having portions 81a, 81b similar to portions 11a', 11b' shown in FIG. 4.

Disk shaped member 12''' is placed in the opening 15a in outer mold jacket 15 and is preferably welded in place by weldment W. The step insert with breakaway tabs on annular flange 80a is mounted to disk-shaped member 15''' in a manner substantially identical to the mounting of lift insert 10' to disk-shaped member 12''' shown in FIG. 4.

Step insert 80 has locking rings for locking a leg of a step inserted at the step insert. The outer flanges 80c serve to anchor the step insert in the cast member.

The cast material is placed in the mold assembly when the step insert is properly mounted. When the cast material has set, the cast member is separated from the mold whereupon the tabs 81 break away from flange 81 and are discarded. The holders may be mounted either the inner or outer jackets of the mold assembly, depending upon the particular application.

What is claimed is:

1. In combination, a lift insert and holder,
   said lift insert comprising:
   a hollow housing having an end provided with a keyhole-shaped opening for receiving a lift pin;
   an annular-shaped flange integral with and extending radially outward from said opening;
   at least two break-away tabs integrally joined to said annular flange, each tab having first and second portions defining an L-shaped cross-section;
   one end of each of said first portions having one end joined to and extending away from said annular flange in an axial direction and another end of each of said first portions joined to one end of a second portion, each second portion extending in a radially outward direction and substantially parallel to said annular flange; and
   said first portion being configured to break away from said flange when exposed to a given shearing force;
   said holder, comprising:
   a hollow, annular-shaped housing having a partially closed end and an open end;
   said open end having an integral, outwardly directed positioning flange;
   said partially closed end having a plurality of curved slots, each slot being positioned to receive one of the breakaway tabs;
   said holder being positioned in a collar arranged at a jacket opening in an outer jacket of a mold assembly with said positioning flange engaging an outer end of said collar;
   a locking pin assembly on said collar having a locking pin and a bias member normally urging said locking pin radially inwardly so as to enter a locking pin opening in said collar and said alignment opening in said holder to maintain an orientation of said holder and thus said lift insert during a casting operation.

2. The combination of claim 1, said holder further comprising:
   said curved slots each having first and second slot portions;
   the first portion of each slot having a given width measured in a radial direction and a length measured in a circumferential direction which permits the breakaway tab to freely enter said first slot portion;
   the second slot portion of each slot having a width measured in the radial direction which is less than the width of said first slot portion, causing said curved flange of the associated breakaway tab to embrace a marginal portion of the slot between an outer surface of said lift insert flange and said breakaway tab flange when said insert is moved relative to said holder to move the breakaway flanges from the first to the second portions of said slots.

3. The combination of claim 1 wherein each of said breakaway tabs has a cam surface facing said annular flange which urges the marginal portions of said second portion of said slots into firm engagement with said insert.

4. The combination of claim 1 wherein said holder has an alignment opening provided along said annular portion for receiving the locking pin.

5. The combination of claim 1 wherein said locking pin assembly is provided with a pull ring for pulling said locking pin in a radially outward direction to remove said locking pin from said alignment opening.

6. The combination of claim 1 wherein said holder is provided with cam surfaces in a marginal portion adjacent said second slot portions for urging the flange portion of said breakaway tabs radially inward.

7. The combination of claim 6 wherein said slots each have a third slot portion adjacent said second slot portion, the outer edge of said third slot portion being a radial distance from a center of said holder closed end greater than an outer edge of said second slot portion adjacent said third slot portion to form a shoulder therebetween to prevent a tab in said third slot portion from being moved to said second slot portion.

* * * * *